Patented Dec. 13, 1932

1,890,924

UNITED STATES PATENT OFFICE

HERBERT A. WINKELMANN, OF AKRON, OHIO, ASSIGNOR TO THE B. F. GOODRICH COMPANY, OF NEW YORK, N. Y., A CORPORATION OF NEW YORK

COMPOSITION OF MATTER AND METHOD OF MAKING SAME

No Drawing. Application filed October 25, 1927. Serial No. 228,703.

This invention relates to compositions derived from rubber and particularly to the reaction products of rubber with metallic salts of organic sulfonic acids, and to a method of making such compositions.

It has heretofore been proposed to produce thermoplastic products from rubber by reacting thereon with reagents having the general formula R—SO$_2$—X, where R represents hydrogen or a hydroxy group and X represents a hydroxy group or chlorine, as is fully described in the U. S. Patent No. 1,605,180, of November 2, 1926.

The present invention is based on the discovery that similar thermoplastic products may be prepared from rubber by admixing with rubber metallic salts of organic sulfonic acids and subjecting the admixture to heat at moderately elevated temperatures. Generally the organic sulfonates of polyvalent metals have been found to be operative, although the salts of the heavy metals are preferred. The following have been shown by test to give satisfactory industrial products: aluminum phenol sulfonate, calcium phenol sulfonate, lead phenol sulfonate, mercury phenol sulfonate, ferric toluene sulfonate, ferric benzene sulfonate, ferric naphthalene sulfonate, ferric phenol sulfonate.

While the organic residue and the substances herein mentioned include only phenol, toluene, benzene and naphthalene, other organic compounds have been found to give satisfactory results and it is the intention to include such metallic organic sulfonates within the purview of this invention.

As a specific example of a method of preparing the thermoplastic derivatives of rubber hereinabove referred to, take crude rubber, such as pale plantation crêpe, 100 parts by weight and intimately admix therewith in any desirable manner, as on a roll mill, 20 parts by weight of ferric toluene sulfonate and subject the batch to heat for several hours at elevated temperatures.

I have found that heating the above admixture for six hours at 140° C. is sufficient to effect the conversion of the rubber to the thermoplastic product desired although a longer or shorter heating may also be employed either with or without the concurrent lowering or raising of the temperature herein specified. I have also found that greater or lesser proportions of the metal organic sulfonate may be employed, as low as 10% giving most satisfactory results, the higher proportions however being in many cases undesirable because the cost of the end product may thereby be greatly increased without obtaining proportionately improved characteristics. It is also to be understood that any other metallic organic sulfonate hereinabove mentioned may be used in the above example to secure similar thermoplastic products.

As has been hereinabove indicated, the products obtained by the process of this application are thermoplastic solids having relatively low softening points. They are consequently remoldable under heat and pressure without heating to the point of liquefaction and are therefore capable of use as basis for the preparation of moldable compositions. They are generally grindable and may be worked or masticated upon a hard rubber mill. They are also soluble to a greater or lesser extent in such organic solvents such as gasoline, benzol, toluol, and the like, and these properties enable the crude product to be homogenized for industrial uses by grinding, mastication or solution. In solution with benzol and like organic solvents, they form the basis of liquid compositions suitable for protective surface coatings or for adhesion. These thermoplastic materials readily mix with fillers, pigments, softeners, vulcanizing agents and other compounding ingredients commonly employed in the rubber industry. These thermoplastics when admixed with these ingredients may be used as compositions for molding articles for industrial or ornamental use, or they may be dissolved in organic solvents to form pigmented protective surface coverings. It is also understood that the thermoplastics hereof may be mixed with the pigments, as on a rubber mill, or the admixture of these ingredients may be made in any other suitable manner.

While only one specific example has been hereinabove set forth and certain substances only have been herein specifically mentioned, it is to be understood that numerous variations and modifications of this specific method may be made and that other compounds of similar chemical constitution may be employed without departing from the principles of this invention, and I therefore do not desire to restrict the invention of this application except as it may be limited in the claims hereto appended.

I claim:

1. The method which comprises intimately admixing an organic sulfonate of a heavy metal with rubber and heating the admixture.

2. The method which comprises admixing cyclic organic sulfonates of heavy metals with rubber and heating the admixture.

3. The method which comprises admixing aromatic organic sulfonates of heavy metals with rubber and heating the admixture.

4. The reaction product, under the influence of heat, of rubber and an organic sulfonate of a heavy metal.

5. The reaction product, under the influence of heat, of rubber and a cyclic organic sulfonate of a heavy metal.

6. The reaction product, under the influence of heat, of rubber and an aromatic organic sulfonate of a heavy metal.

7. The method which comprises intimately admixing with rubber a salt of a polyvalent metal with an aromatic sulfonic acid, and heating the admixture.

8. The reaction product, under the influence of heat, of rubber and a salt of a polyvalent metal with an aromatic sulfonic acid.

9. The method which comprises intimately admixing an organic sulfonate of a polyvalent metal with rubber and heating the admixture.

10. The reaction product, under the influence of heat, of rubber and an organic sulfonate of a polyvalent metal.

11. The method which comprises admixing into rubber a salt of a heavy metal with an aromatic sulfonic acid, and heating the admixture until the rubber is converted to a hard thermoplastic substance.

12. The method which comprises admixing into rubber a salt of a heavy metal with sulfonic acid derived from an aromatic hydrocarbon, and heating the admixture.

13. The method which comprises admixing into rubber a salt of iron with an aromatic sulfonic acid, and heating the admixture.

14. The method which comprises admixing into rubber a ferric salt of a sulfonic acid derived from an aromatic hydrocarbon and heating the admixture.

15. The method which comprises admixing into rubber a salt of a heavy metal with a sulfonic acid derived from a phenol, and heating the admixture.

16. The method which comprises admixing into rubber a ferric salt of a sulfonic acid derived from a phenol, and heating the admixture.

17. The reaction product, under the influence of heat, of rubber and a salt of a heavy metal with a sulfonic acid derived from an aromatic hydrocarbon.

18. The reaction product, under the influence of heat, of rubber and a salt of a heavy metal with a sulfonic acid derived from a phenol.

In witness whereof I have hereunto set my hand this 21st day of October, 1927.

H. A. WINKELMANN.